(12) United States Patent
Yamanaka et al.

(10) Patent No.: US 11,319,869 B2
(45) Date of Patent: May 3, 2022

(54) ACTUATOR

(71) Applicant: DENSO CORPORATION, Kariya (JP)

(72) Inventors: Tetsuji Yamanaka, Kariya (JP); Kunio Namba, Kariya (JP); Naoaki Kono, Kariya (JP); Atsushi Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 236 days.

(21) Appl. No.: 16/840,798

(22) Filed: Apr. 6, 2020

(65) Prior Publication Data

US 2020/0232382 A1 Jul. 23, 2020

Related U.S. Application Data

(63) Continuation of application No. PCT/JP2018/038661, filed on Oct. 17, 2018.

(30) Foreign Application Priority Data

Oct. 20, 2017 (JP) .............................. JP2017-203291

(51) Int. Cl.
*F02B 37/18* (2006.01)
*F02B 51/04* (2006.01)
*F02D 41/00* (2006.01)

(52) U.S. Cl.
CPC ............ *F02B 37/186* (2013.01); *F02B 51/04* (2013.01); *F02D 41/0007* (2013.01)

(58) Field of Classification Search
CPC .................... F02B 37/18–186; F02B 51/04
See application file for complete search history.

(56) References Cited

U.S. PATENT DOCUMENTS

| 2014/0000399 A1 | 1/2014 | Inoue et al. |
| 2015/0204433 A1 | 7/2015 | Inoue et al. |
| 2018/0187791 A1 | 7/2018 | Yamanaka et al. |

FOREIGN PATENT DOCUMENTS

| JP | 2013-256885 | 12/2013 |
| WO | 2019/078255 | 4/2019 |
| WO | 2019/078260 | 4/2019 |

OTHER PUBLICATIONS

U.S. Appl. No. 16/840,861 to Tanaka, et al., entitled "Actuator", filed Apr. 6, 2020 (36 pages).
U.S. Appl. No. 16/842,108 to Yamaguchi, et al., entitled "Actuator", filed Apr. 7, 2020 (27 pages).

*Primary Examiner* — Ngoc T Nguyen
(74) *Attorney, Agent, or Firm* — Nixon & Vanderhye P.C.

(57) ABSTRACT

An actuator is configured to drive a boost pressure control valve of a supercharger and includes an electric motor, an output shaft, a speed reducer, a rotational angle sensor and a magnetic circuit holder member. The speed reducer includes a final gear. The final gear is made of metal and is fixed to the output shaft, and the speed reducer reduces a speed of rotation outputted from the electric motor and transmits the rotation of the reduced speed to the output shaft. The rotational angle sensor includes a magnetic circuit device and a sensing device and senses a rotational angle of the output shaft. The magnetic circuit holder member is a non-magnetic member fixed to the output shaft. The magnetic circuit holder member is formed separately from the final gear and holds the magnetic circuit device.

13 Claims, 18 Drawing Sheets

ACTUATOR

CROSS REFERENCE TO RELATED APPLICATIONS

This application is a continuation application of International Patent Application No. PCT/JP2018/038661 filed on Oct. 17, 2018, which designated the U.S. and claims the benefit of priority from Japanese Patent Application No. 2017-203291 filed on Oct. 20, 2017. The entire disclosures of all of the above applications are incorporated herein by reference.

TECHNICAL FIELD

The present disclosure relates to an actuator that drives a boost pressure control valve of a supercharger.

BACKGROUND

Previously, there is known an actuator that is connected to the boost pressure control valve through, for example, a linkage mechanism and controls a boost pressure by adjusting a valve opening degree of the boost pressure control valve.

SUMMARY

This section provides a general summary of the disclosure, and is not a comprehensive disclosure of its full scope or all of its features.

According to the present disclosure, there is provided an actuator configured to drive a boost pressure control valve of a supercharger. The actuator includes an electric motor, an output shaft, a speed reducer, a rotational angle sensor and a magnetic circuit holder member. The speed reducer includes a final gear. The final gear is made of metal and is fixed to the output shaft, and the speed reducer is configured to reduce a speed of rotation outputted from the electric motor and transmit the rotation of the reduced speed to the output shaft. The rotational angle sensor includes a magnetic circuit device and a sensing device and is configured to sense a rotational angle of the output shaft. The magnetic circuit holder member is fixed to the output shaft and holds the magnetic circuit device.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
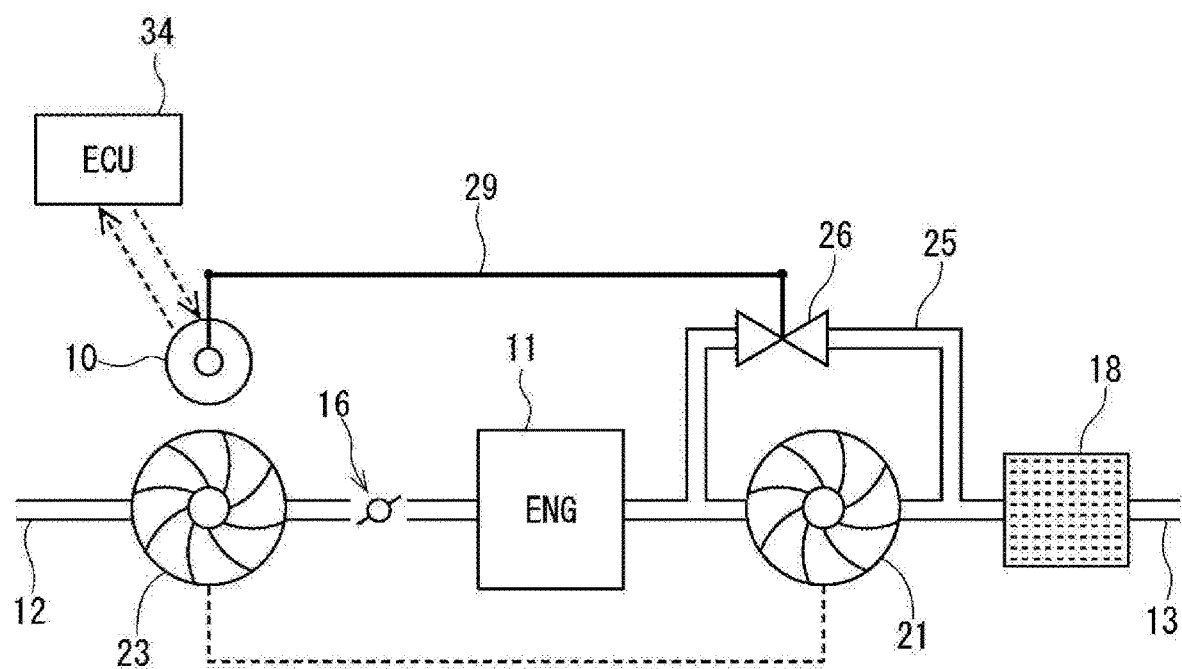
FIG. 1 is a schematic diagram showing an intake and exhaust system of an internal combustion engine, at which an actuator according to an embodiment is applied.

Previously, there is known an actuator that is connected to the boost pressure control valve through, for example, a linkage mechanism and controls a boost pressure by adjusting a valve opening degree of the boost pressure control valve. One such actuator reduces a speed of rotation outputted from an electric motor through a speed reducer and thereafter outputs the rotation through an output shaft. A rotational angle of the output shaft is sensed with a contactless rotational angle sensor that includes a magnetic circuit device and a sensing device. A final gear of the speed reducer is a resin member that is integrally fixed to the output shaft, and the magnetic circuit device is insert molded in the final gear.

When the actuator is applied to an engine, which has a large exhaust gas pulsation, or a supercharger, which has a large wastegate port diameter, an excess stress is exerted to teeth of the final gear. In this case, the teeth of the final gear made of resin may possibly be damaged.

In view of the above point, the inventors of the present disclosure have been considering making the final gear from metal. However, in such a case, a way of fixing the magnetic circuit device needs to be considered. The magnetic circuit device needs to be fixed with a non-magnetic material. When the magnetic circuit device is fixed with a magnetic material, sensing accuracy of the sensing device may possibly be deteriorated due to, for example, a reduction in a dynamic range of a density of a magnetic flux sensed with the sensing device or an increase in a disturbing magnetic flux caused by a magnetic flux leakage from the magnetic circuit device.

An actuator of the present disclosure includes an electric motor, an output shaft, a speed reducer, a rotational angle sensor and a magnetic circuit holder member. The speed reducer includes a final gear. The final gear is made of metal and is fixed to the output shaft, and the speed reducer reduces a speed of rotation outputted from the electric motor and transmits the rotation of the reduced speed to the output shaft. The rotational angle sensor includes a magnetic circuit device and a sensing device and senses a rotational angle of the output shaft. The magnetic circuit holder member is a non-magnetic member fixed to the output shaft. The magnetic circuit holder member is formed separately from the final gear and holds the magnetic circuit device.

Since the final gear and the magnetic circuit holder member are the separate members, which are formed separately, it is possible to select an optimal material for each of the final gear and the magnetic circuit holder member. By forming the final gear from the metal, it is possible to ensure a required strength against a relatively large load generated by an exhaust gas pulsation. In this way, damage to the final gear is limited. Furthermore, since the magnetic circuit holder member is formed as the non-magnetic member, the magnetic circuit device can be fixed to the output shaft without leaking the magnetic flux and without increasing the disturbing magnetic flux. In this way, it is possible to limit the deterioration in the rotational angle sensing accuracy while implementing the structure for fixing the magnetic circuit device to the output shaft.

(Embodiment)

Hereinafter, an embodiment will be described with reference to the drawings. As shown in FIG. 1, an actuator 10 of the present embodiment is applied to an internal combustion engine 11 that is a drive source for driving a vehicle.

(Intake and Exhaust System of Engine)

Figure 2:
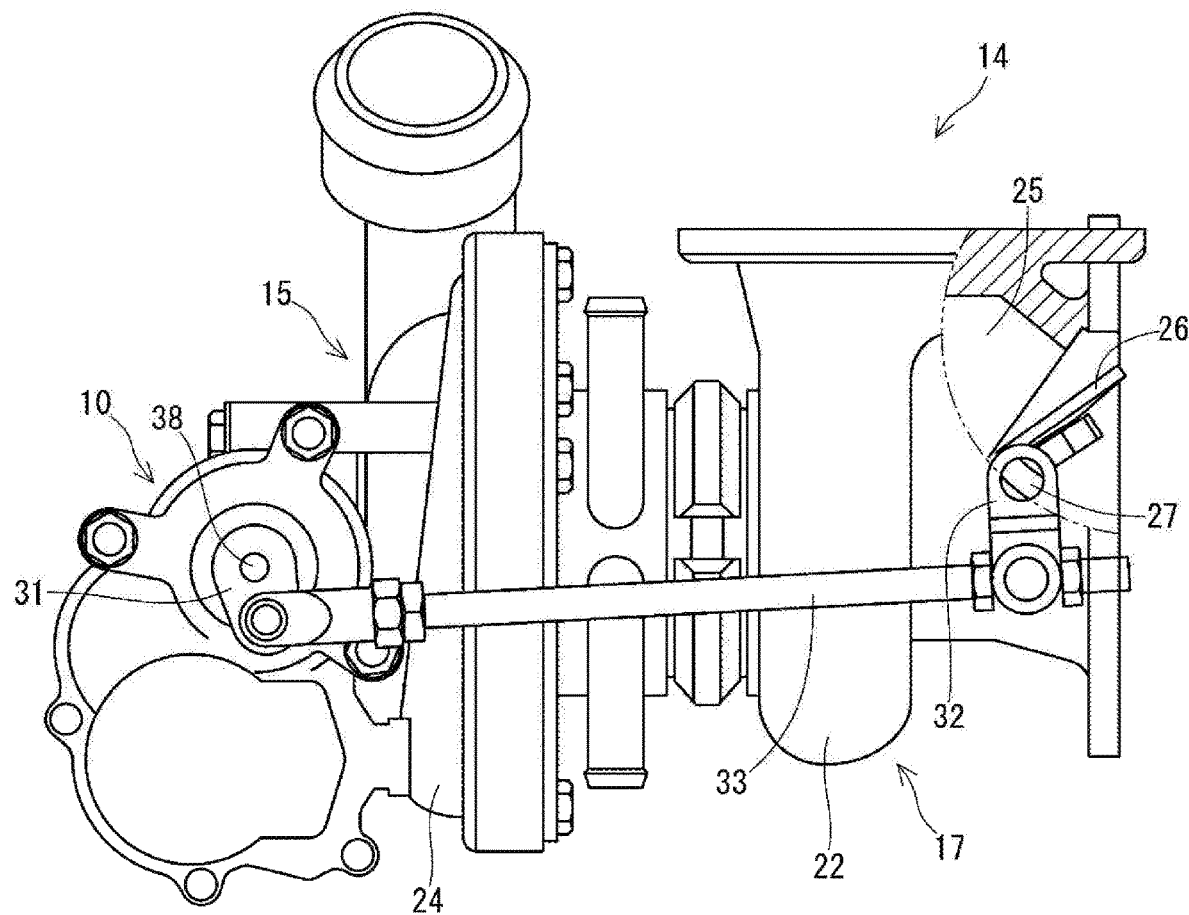
FIG. 2 is a descriptive diagram of a supercharger.

First of all, an intake and exhaust system of the engine 11 will be described with reference to FIGS. 1 and 2. The engine 11 has an intake passage 12, which conducts intake air to cylinders of the engine 11, and an exhaust passage 13, which discharges an exhaust gas generated at the cylinders to the atmosphere. An intake compressor 15 of a supercharger 14 and a throttle valve 16 are installed in the intake passage 12. The throttle valve 16 adjusts the amount of intake air supplied to the engine 11. An exhaust turbine 17 of the supercharger 14 and a catalyst 18 are installed in the exhaust passage 13. The catalyst 18 purifies the exhaust gas. The catalyst 18 is a known three-way catalyst, which has a monolithic structure. When the temperature of the catalyst 18 is raised to an activation temperature by the exhaust gas, the catalyst 18 purifies harmful substances contained in the exhaust gas through oxidation and reduction.

The exhaust turbine 17 includes a turbine wheel 21, which is rotated by the exhaust gas outputted from the engine 11, and a turbine housing 22, which is shaped in a spiral form and receives the turbine wheel 21. The intake compressor 15 includes a compressor wheel 23, which is rotated by a rotational force of the turbine wheel 21, and a compressor housing 24, which is shaped in a spiral form and receives the compressor wheel 23.

A bypass passage 25 is formed at the turbine housing 22. The bypass passage 25 conducts the exhaust gas while bypassing the turbine wheel 21. The bypass passage 25 directly conducts the exhaust gas, which enters the turbine housing 22, to an exhaust gas outlet of the turbine housing 22. The bypass passage 25 can be opened and closed by a wastegate valve 26. The wastegate valve 26 is a swing valve that is rotatably supported by a valve shaft 27 at the inside of the turbine housing 22.

The supercharger 14 includes the actuator 10 as a drive means for driving the wastegate valve 26. The actuator 10 is installed to the intake compressor 15 that is spaced away from the exhaust turbine 17 to avoid influences of the heat of the exhaust gas. The supercharger 14 includes a linkage mechanism 29 that transmits the output of the actuator 10 to the wastegate valve 26. The linkage mechanism 29 is a so-called four-bar linkage. The linkage mechanism 29 includes: an actuator lever 31, which is rotated by the actuator 10; a valve lever 32, which is coupled to the valve shaft 27; and a rod 33, which transmits a rotational torque from the actuator lever 31 to the valve lever 32.

The operation of the actuator 10 is controlled by an ECU (Engine Control Unit) 34 that has a microcomputer. Specifically, the ECU 34 controls a boost pressure of the supercharger 14 by adjusting an opening degree of the wastegate valve 26 at, for example, a high rotational speed of the engine 11. Furthermore, when the temperature of the catalyst 18 does not reach the activation temperature thereof at, for example, the time immediately after cold start of the engine 11, the ECU 34 fully opens the wastegate valve 26 to warm up the catalyst 18 with the exhaust gas. In this way, the high temperature exhaust gas, which has not lost its heat to the turbine wheel 21, can be conducted to the catalyst 18, so that the catalyst 18 can be warmed up within a short period of time.

(Actuator)

Next, the actuator 10 will be described with reference to FIGS. 3 to 7. The actuator 10 includes a housing 35, an electric motor 36, a speed reducer 37, an output shaft 38 and a rotational angle sensor 39. The housing 35 is installed to the intake compressor 15, and the electric motor 36, the speed reducer 37, the output shaft 38 and the rotational angle sensor 39 are installed in the housing 35.

Figure 3:
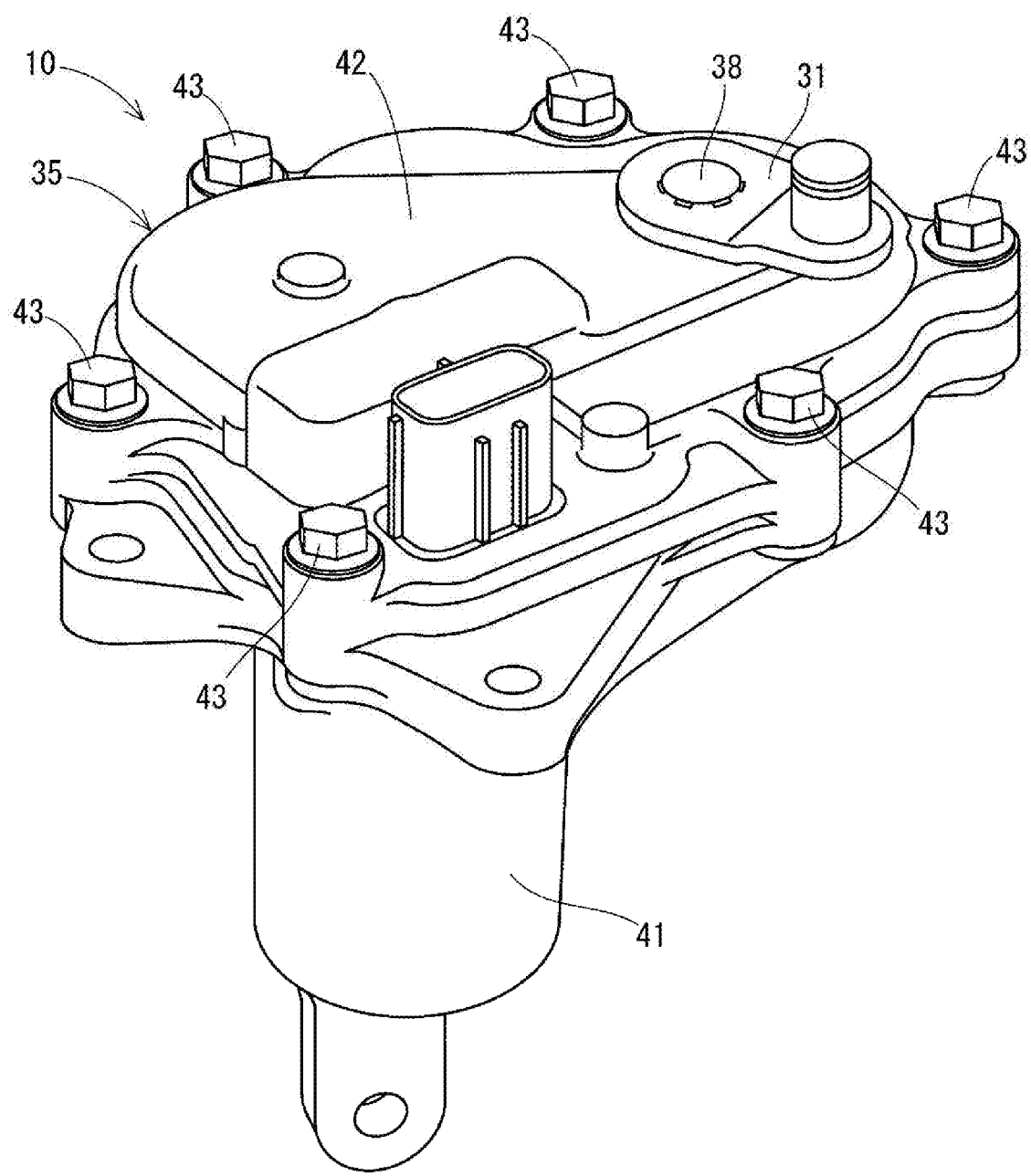
FIG. 3 is a perspective view of the actuator.
Figure 4:
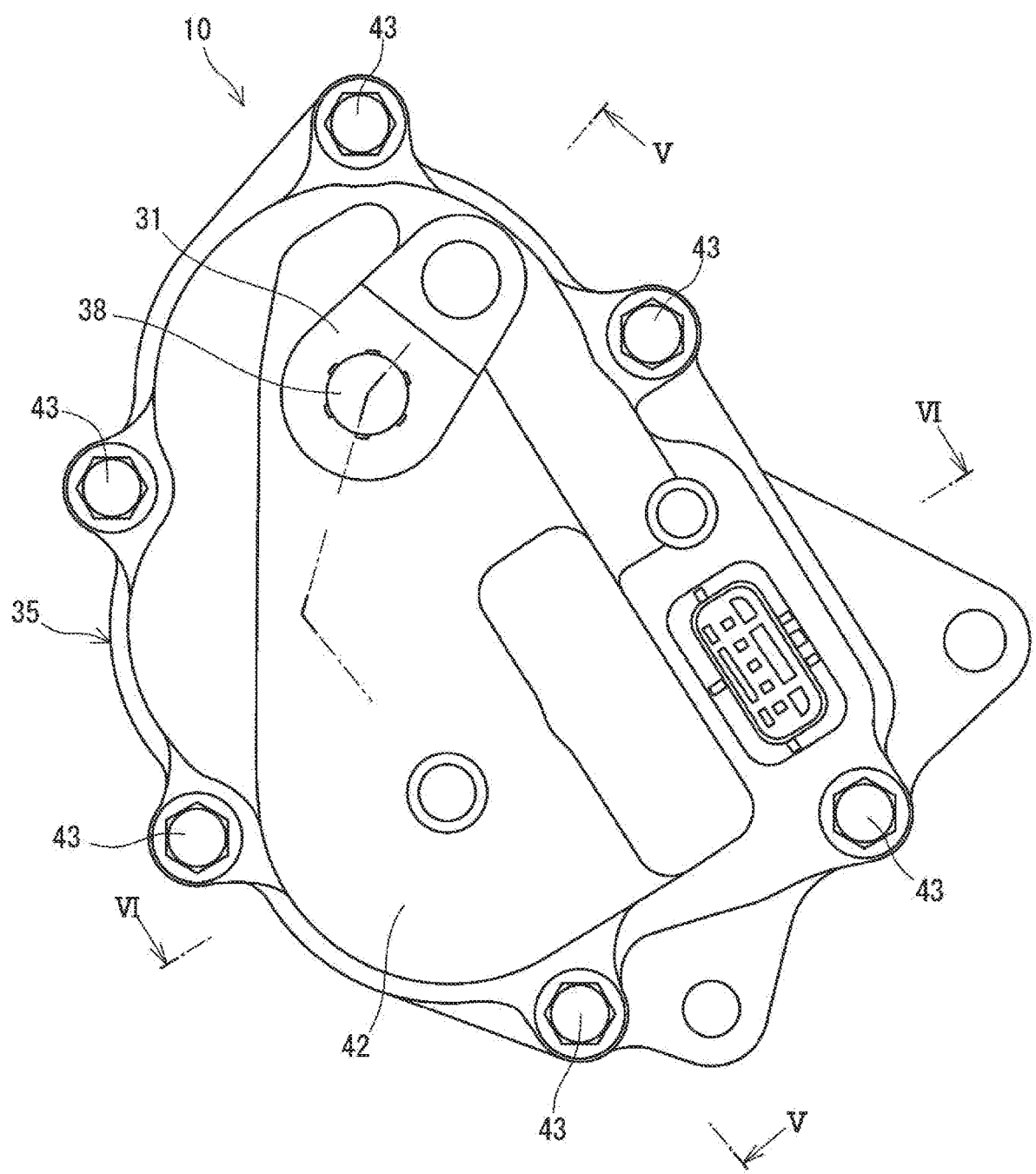
FIG. 4 is a top view of the actuator.
Figure 5:
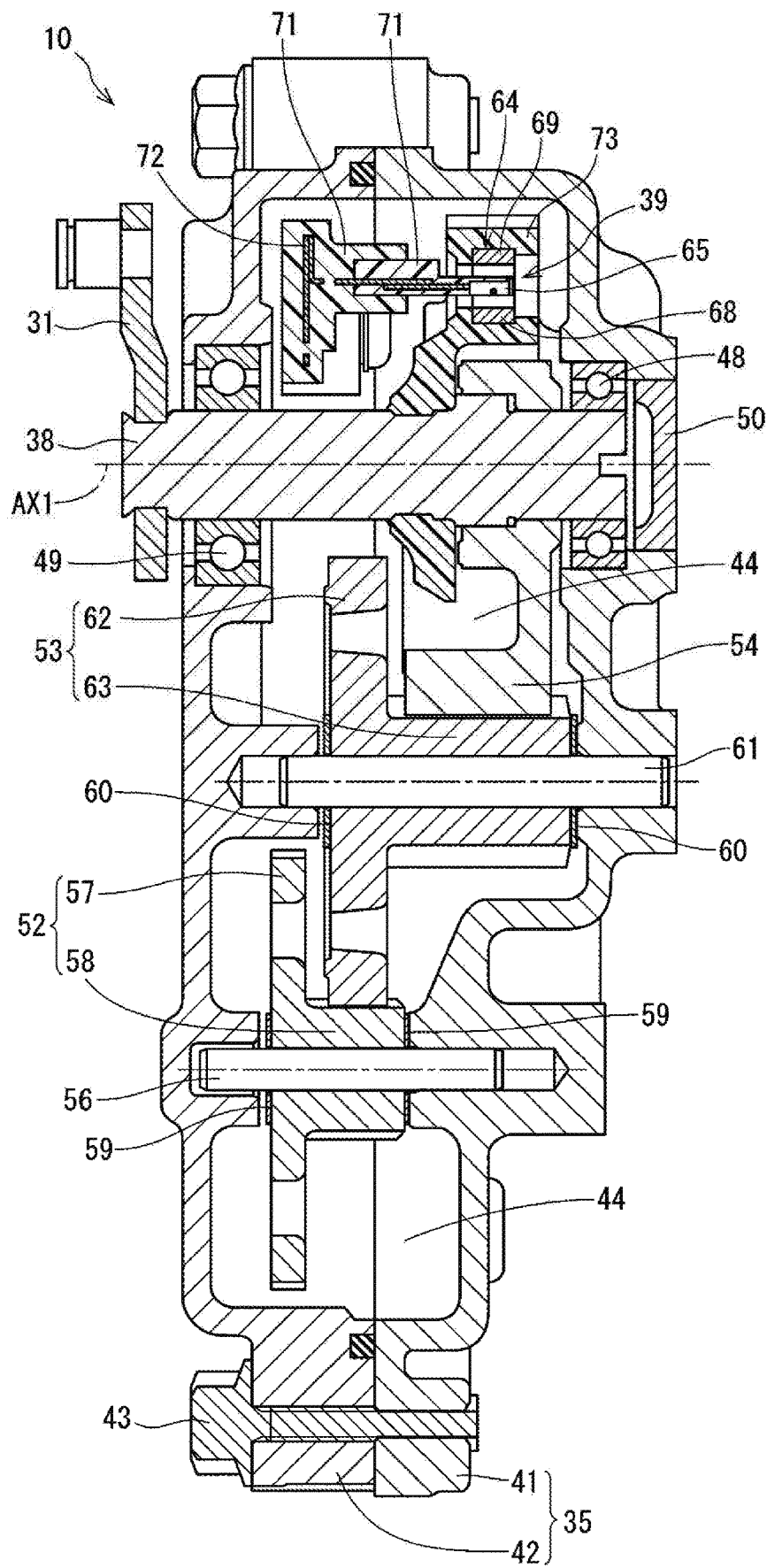
FIG. 5 is a cross-sectional view taken along line V-V in FIG. 4.

As shown in FIGS. 3 to 5, the housing 35 includes a first housing segment 41 and a second housing segment 42. The second housing segment 42 is joined to the first housing segment 41 by fastening members 43. The first housing segment 41 and the second housing segment 42 cooperate together to form a receiving space 44 therein. The first housing segment 41 and the second housing segment 42 are made of a metal material, such as an aluminum alloy, and are formed by die casting.

Figure 6:
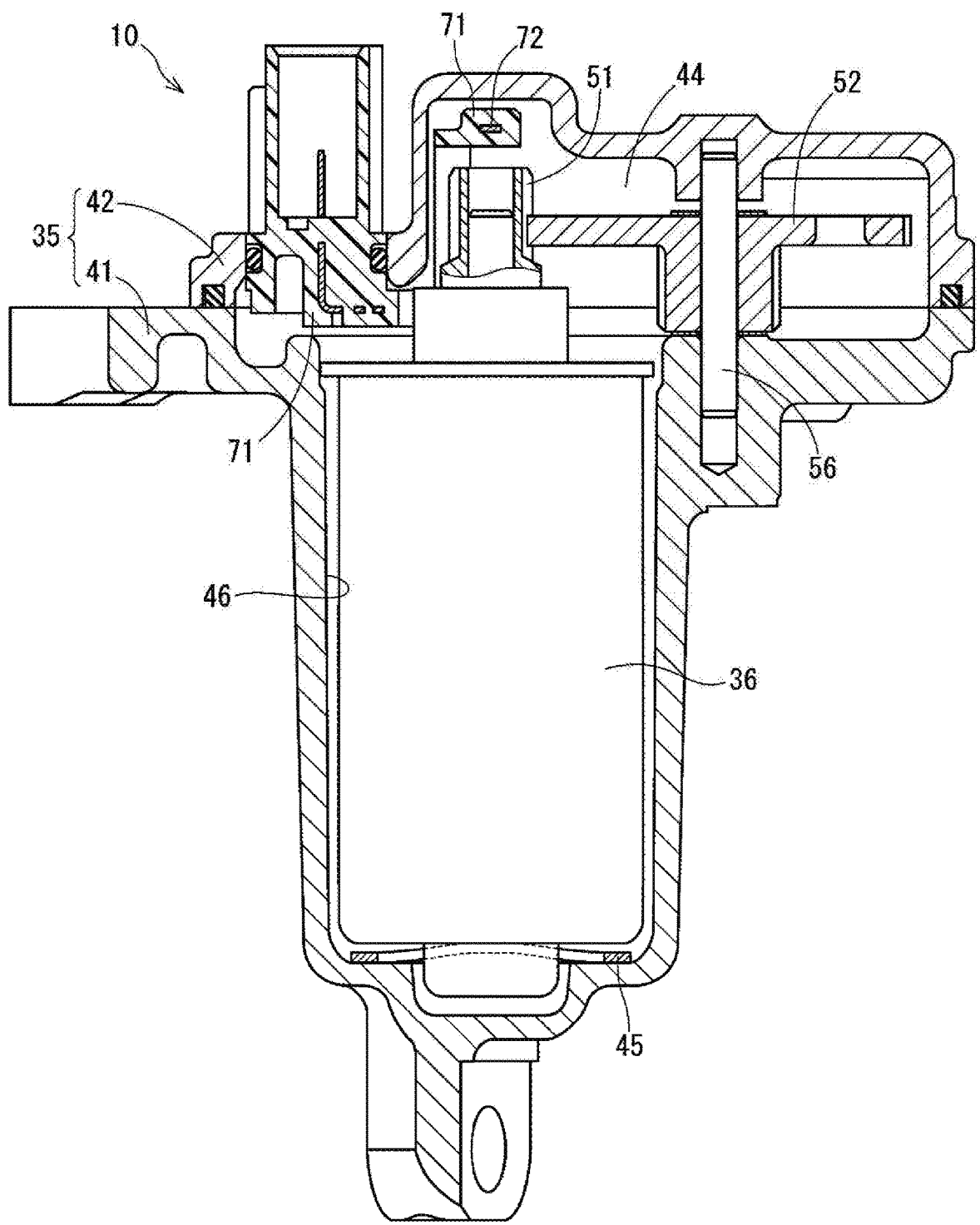
FIG. 6 is a cross-sectional view taken along line VI-VI in FIG. 4.
Figure 7:
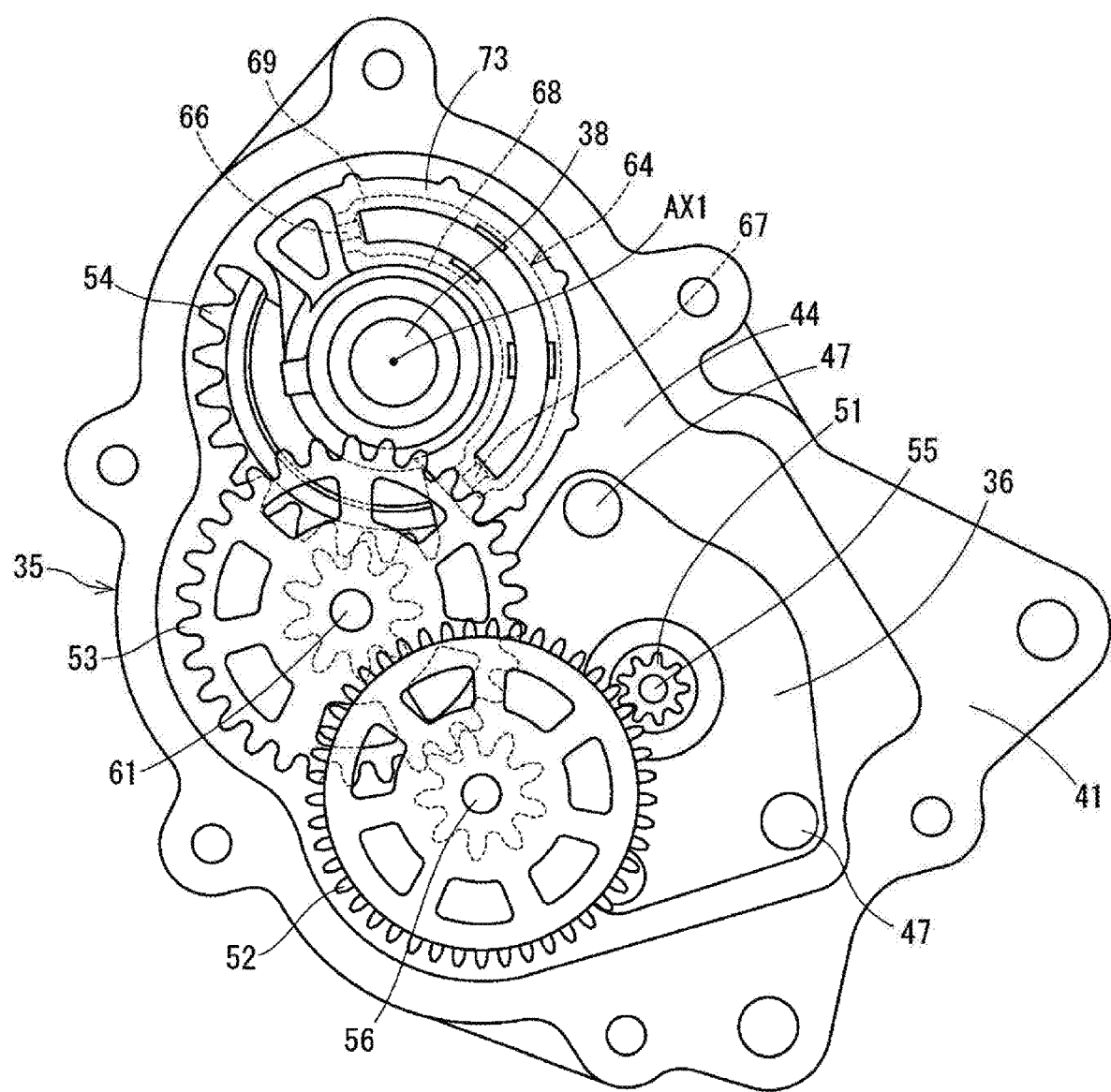
FIG. 7 is a diagram showing a state where a second housing segment of the actuator of FIG. 4 is removed.
Figure 8:
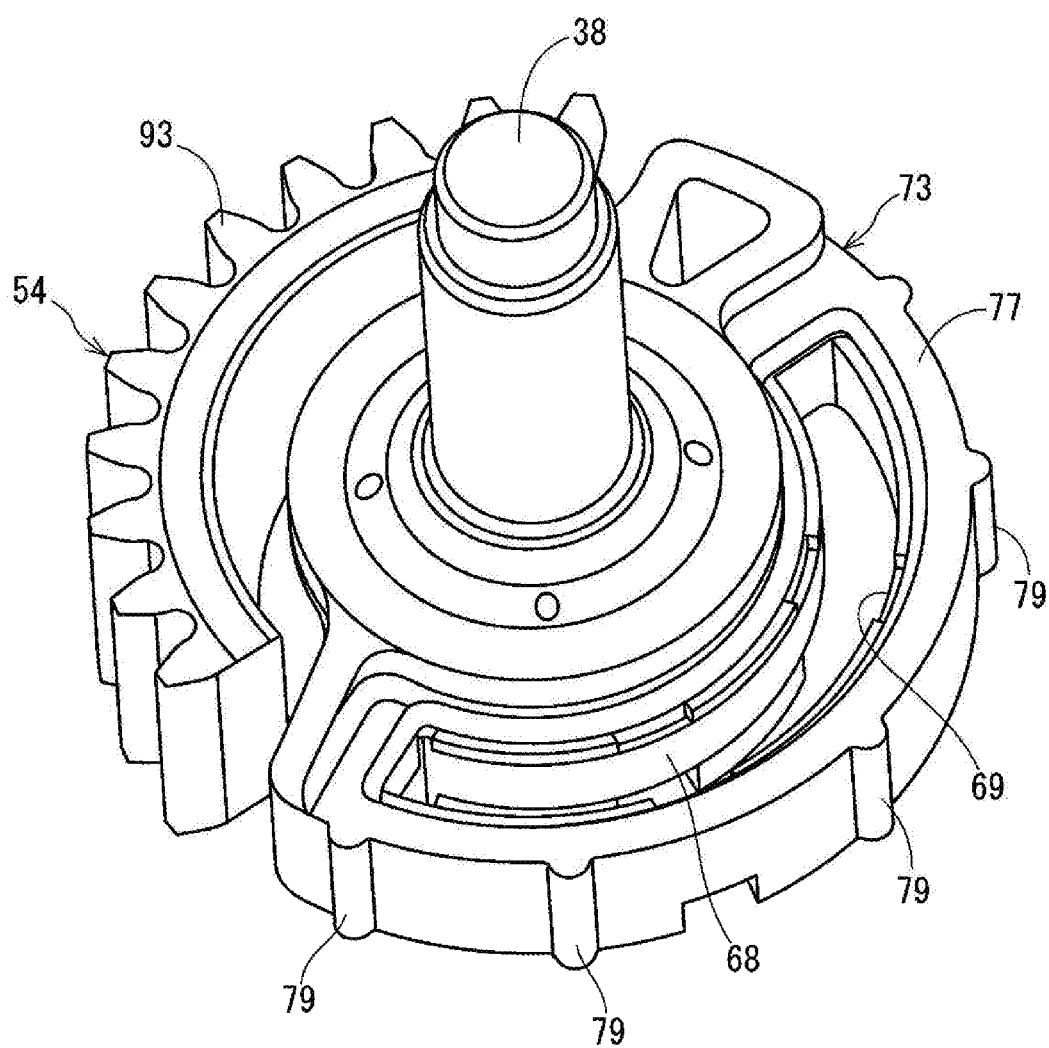
FIG. 8 is a perspective view of an output shaft, to which a final gear and a magnetic circuit holder member are fixed.

As shown in FIGS. 6 and 7, the electric motor 36 is received in the housing 35. Specifically, the electric motor 36 is inserted into a motor insertion hole 46 formed at the first housing segment 41 and is fixed to the first housing segment 41 by screws 47. A wave washer 45 is installed between the electric motor 36 and a bottom surface of the motor insertion hole 46. The electric motor 36 may be any type of electric motor, such as a known DC motor, a known stepping motor or the like.

As shown in FIG. 5, the output shaft 38 is rotatably supported by a bearing 48, which is installed to the first housing segment 41, and a bearing 49, which is installed to the second housing segment 42. One end portion of the output shaft 38 outwardly projects from the housing 35. The actuator lever 31 is fixed to the output shaft 38 at the outside of the housing 35. A plug 50 is press fitted to a portion of the first housing segment 41, which is located at the other end side of the output shaft 38 along an imaginary extension line of the output shaft 38.

As shown in FIGS. 5 to 7, the speed reducer 37 is a parallel shaft speed reducer that reduces the speed of the rotation outputted from the electric motor 36 and transmits the rotation of the reduced speed to the output shaft 38. The speed reducer 37 includes a pinion gear 51, a first intermediate gear 52, a second intermediate gear 53 and a final gear 54. The pinion gear 51 is fixed to a motor shaft 55 of the electric motor 36. The first intermediate gear 52 is rotatably supported by a first metal shaft 56 and includes: a first large diameter external gear 57, which is meshed with the pinion gear 51; and a first small diameter external gear 58 that has a diameter smaller than a diameter of the first large diameter external gear 57. Two primary washers 59 are respectively installed to a location between the first intermediate gear 52 and the first housing segment 41 and a location between the first intermediate gear 52 and the second housing segment 42. The second intermediate gear 53 is rotatably supported by a second metal shaft 61 and includes: a second large diameter external gear 62, which is meshed with the first small diameter external gear 58; and a second small diameter external gear 63 that has a diameter smaller than a diameter of the second large diameter external gear 62. Two secondary washers 60 are respectively installed to a location between the second intermediate gear 53 and the first housing segment 41 and a location between the second intermediate gear 53 and the second housing segment 42. The final gear 54 is fixed to the output shaft 38 and is meshed with the second small diameter external gear 63.

As shown in FIGS. 5 and 7, the rotational angle sensor 39 is a contactless sensor that senses a rotational angle of the output shaft 38, and the rotational angle sensor 39 includes a magnetic circuit device 64 and a sensing device 65. The magnetic circuit device 64 includes magnets (serving as magnetic flux generators) 66, 67 and yokes (serving as magnetic flux conductors) 68, 69. The magnets 66, 67 and the yokes 68, 69 form a closed magnetic circuit that is shaped in an axial view taken in an axial direction of the output shaft 38. The magnetic circuit device 64 is rotated integrally with the output shaft 38. The sensing device 65 is, for example, a Hall IC and is placed at an inside of the closed magnetic circuit of the magnetic circuit device 64. The sensing device 65 is insert molded in a wiring holder member 71 made of a dielectric material and is fixed to the housing 35. The basic applications and functions of the magnetic circuit device 64 and the sensing device 65 are the same as those disclosed in JP2014-126548A (corresponding to US2014/0184204A, the disclosure of which is incorporated herein by reference in its entirety). The rotational angle of the output shaft 38, which is sensed with the rotational angle sensor 39, is outputted to the ECU 34 (see FIG. 1).

(Output Shaft and Peripheral Members Thereof)

Next, the output shaft 38 and the peripheral members thereof will be described with reference to FIGS. 5 to 19. Hereinafter, the axial direction of the output shaft 38 will be simply referred to as an axial direction. Furthermore, a circumferential direction about an axis AX1 of the output shaft 38 will be simply referred to as a circumferential direction.

As shown in FIG. 5, the actuator 10 includes a magnetic circuit holder member 73 that is fixed to the output shaft 38 and holds the magnetic circuit device 64. The magnetic circuit holder member 73 is a separate member that is formed separately from the final gear 54, and a material of the magnetic circuit holder member 73 is different from a material of the final gear 54. The first intermediate gear 52, the second intermediate gear 53 and the final gear 54 are made of iron-based sintered metal. In contrast, the magnetic circuit holder member 73 is a non-magnetic member and is made of resin.

Figure 11:
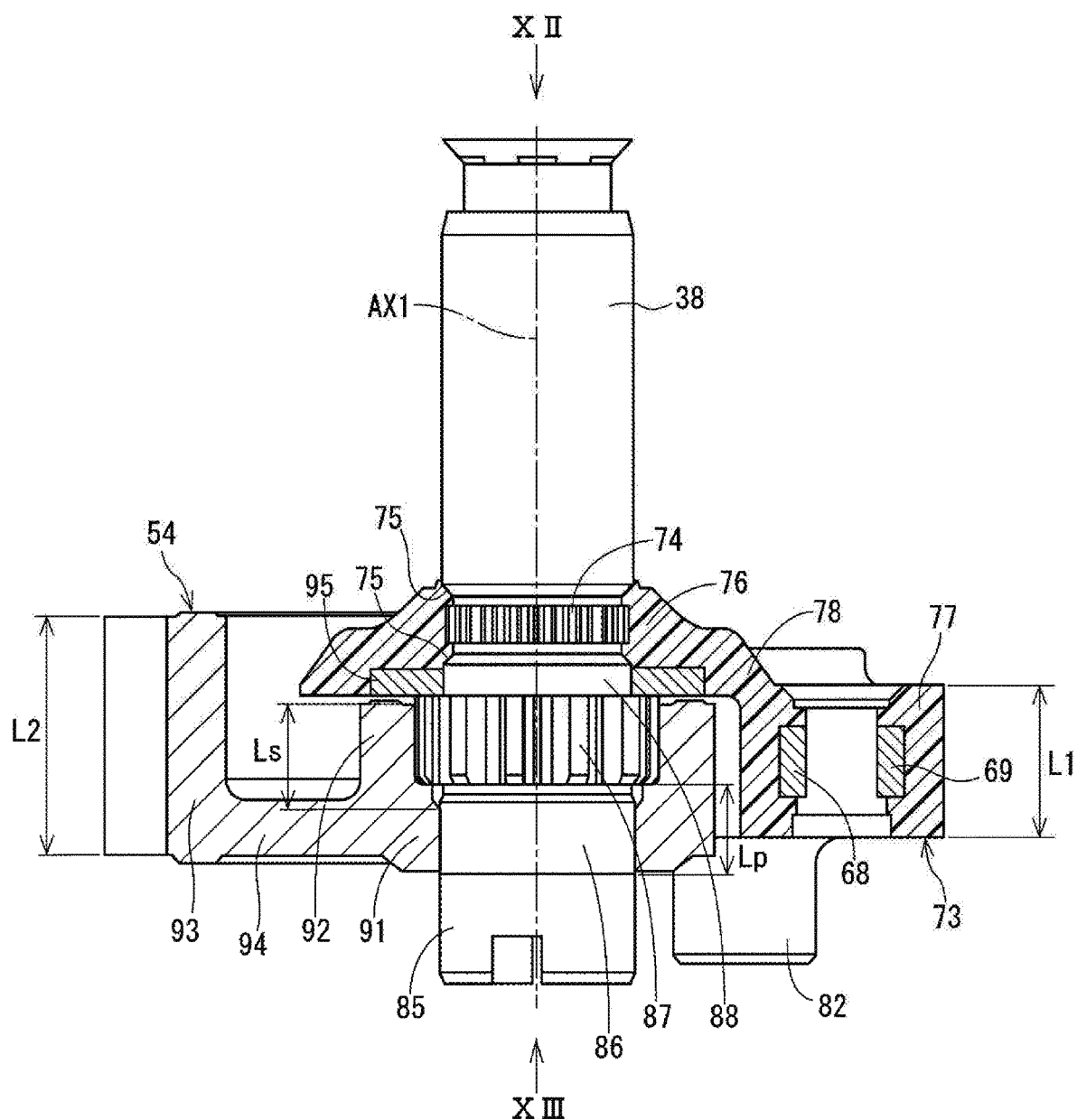
FIG. 11 is a longitudinal cross-sectional view showing the output shaft, to which the final gear and the magnetic circuit holder member are fixed.

As shown in FIG. 11, the output shaft 38 includes: a knurled portion 74, in which knurls are formed; and a pair of stepped portions 75 that are located on two opposite sides of the knurled portion 74 in the axial direction and are opposed to the knurled portion 74. A type of the knurls may be, for example, the linear knurl. The magnetic circuit holder member 73 includes: a fixing portion 76, which is fixed integrally to the knurled portion 74 and the stepped portions 75; a holding portion 77, which holds the magnetic circuit device 64; and a connecting portion 78, which connects between the fixing portion 76 and the holding portion 77.

As shown in FIGS. 8, 9 and 11-13, the magnetic circuit holder member 73 forms an insert-molded product, in which the magnetic circuit holder member 73, the output shaft 38 and the magnetic circuit device 64 are integrated together in one piece. In the holding portion 77 of the magnetic circuit holder member 73, an inside of the magnetic circuit device 64, into which the sensing device 65 is inserted to sense a magnetic flux, is not resin molded.

Figure 13:
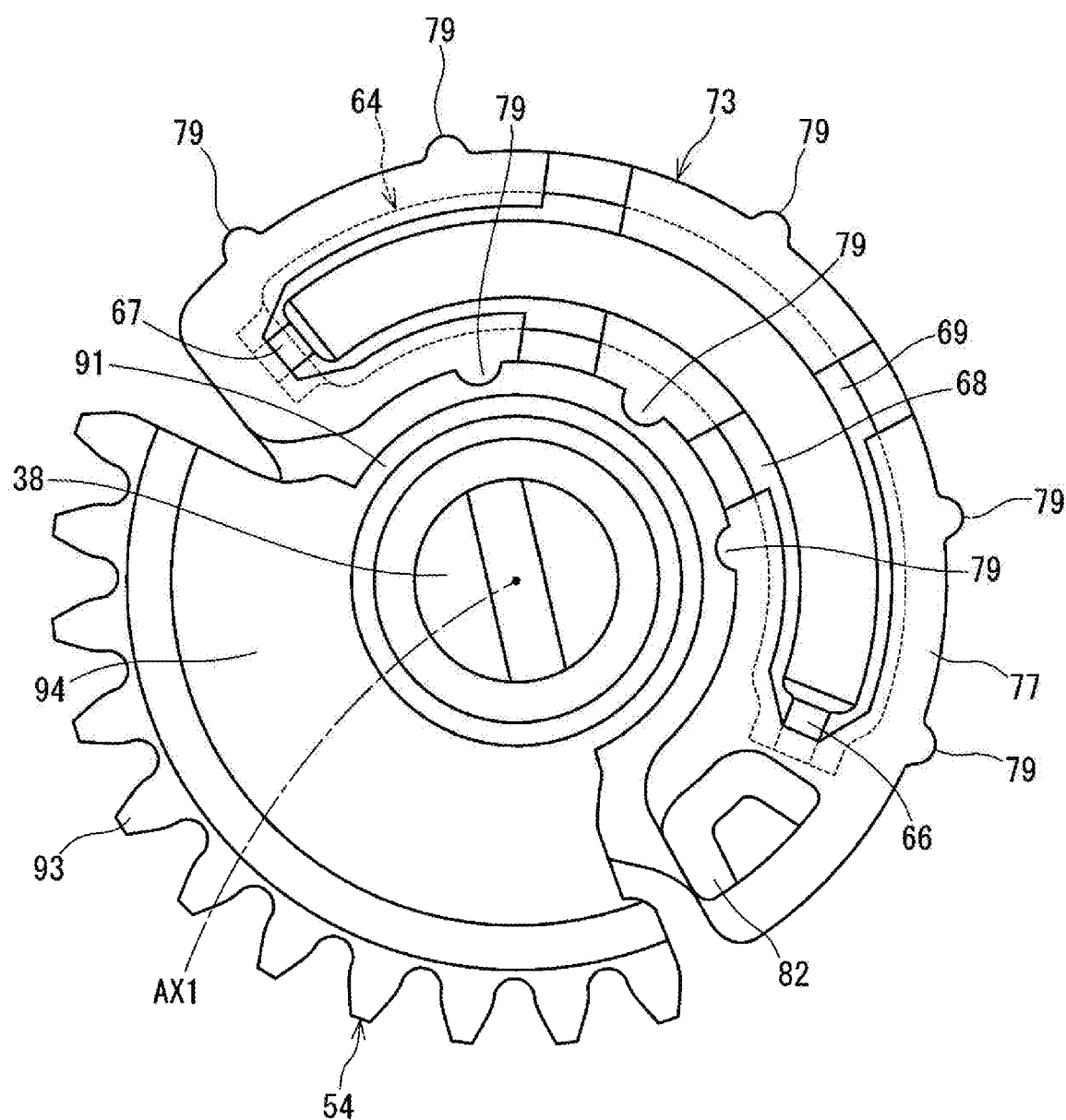
FIG. 13 is a view of the output shaft and the other components of FIG. 11 taken in a direction of an arrow XIII in FIG. 11.
Figure 14:
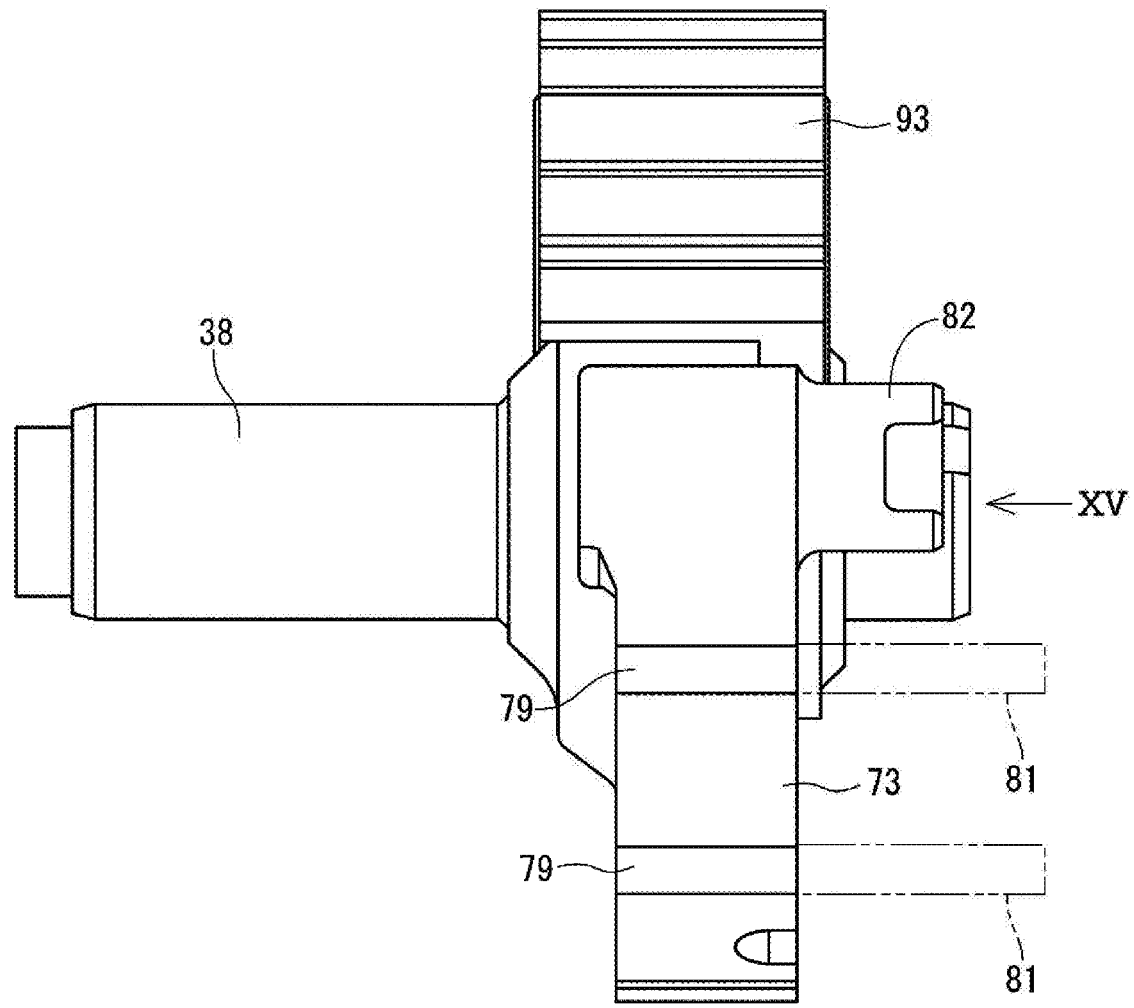
FIG. 14 is a side view of the output shaft, to which the final gear and the magnetic circuit holder member are fixed.
Figure 15:
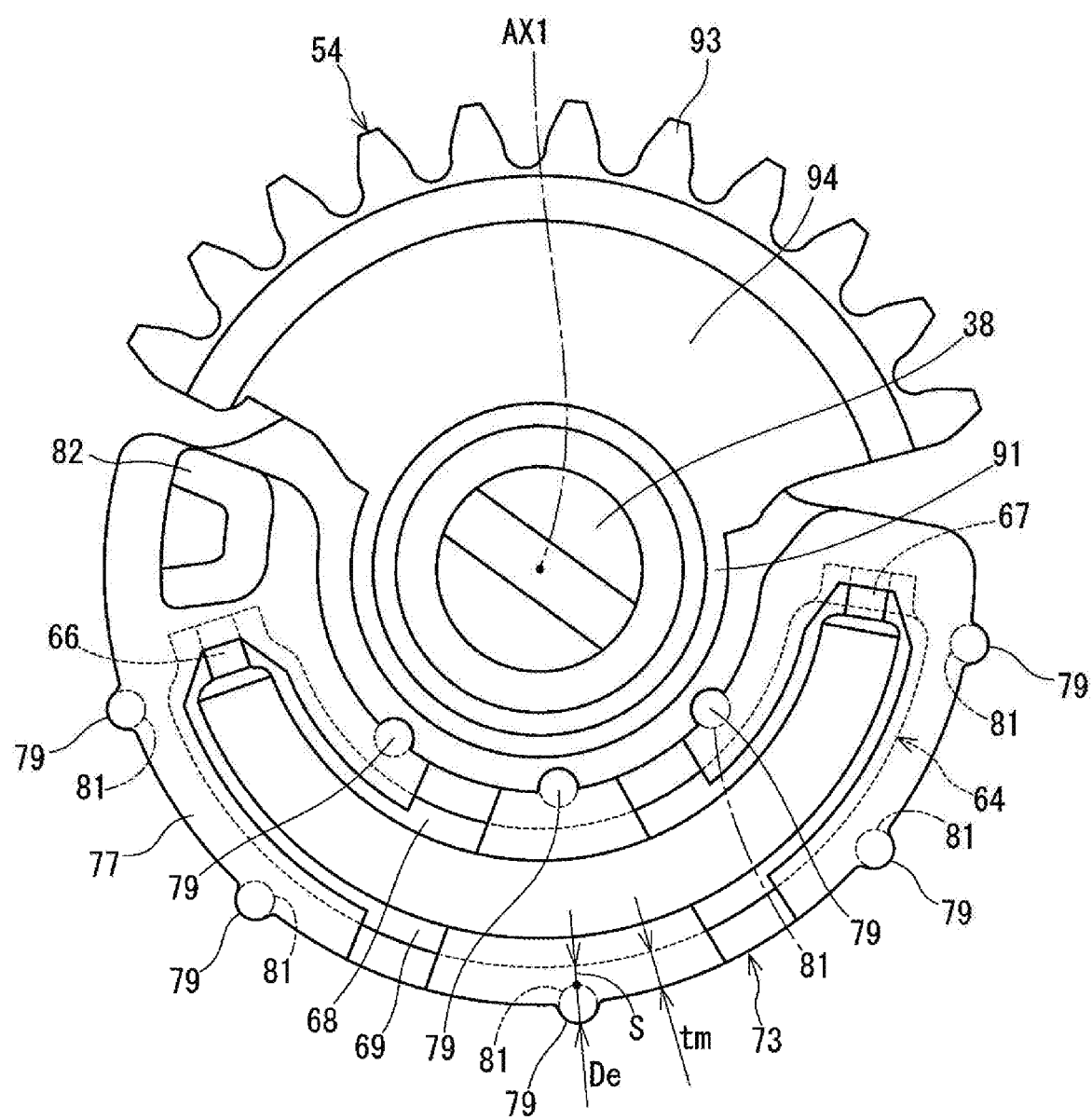
FIG. 15 is a view of the output shaft and the other components of FIG. 14 taken in a direction of an arrow XV in FIG. 14.

As shown in FIG. 13, the holding portion 77 includes a plurality of pressing parts 79 that are respectively formed at locations, which are outwardly spaced from the magnetic circuit device 64 in the axial view. As shown in FIGS. 14 and 15, each of the pressing parts 79 functions as a pedestal that receives a corresponding one of ejector pins 81 at a mold release time that is a time for releasing the magnetic circuit holder member 73 from a molding die. In the present embodiment, each pressing part 79 has a projection that outwardly projects beyond a required resin thickness tm that is required to hold the magnetic circuit device 64. Even when the required resin thickness tm is smaller than a diameter De of the respective ejector pins 81, the magnetic circuit holder member 73 can be released from the molding die without pressing the magnetic circuit device 64 with the ejector pins 81 at the mold release time due to the provision of the pressing parts 79. In the axial view, a gap S between the magnetic circuit device 64 and the ejector pin 81 is set such that an adjacent part of the holding portion 77, which is adjacent to the magnetic circuit device 64, is not deformed by the ejector pins 81 at the mold release time.

Figure 16:
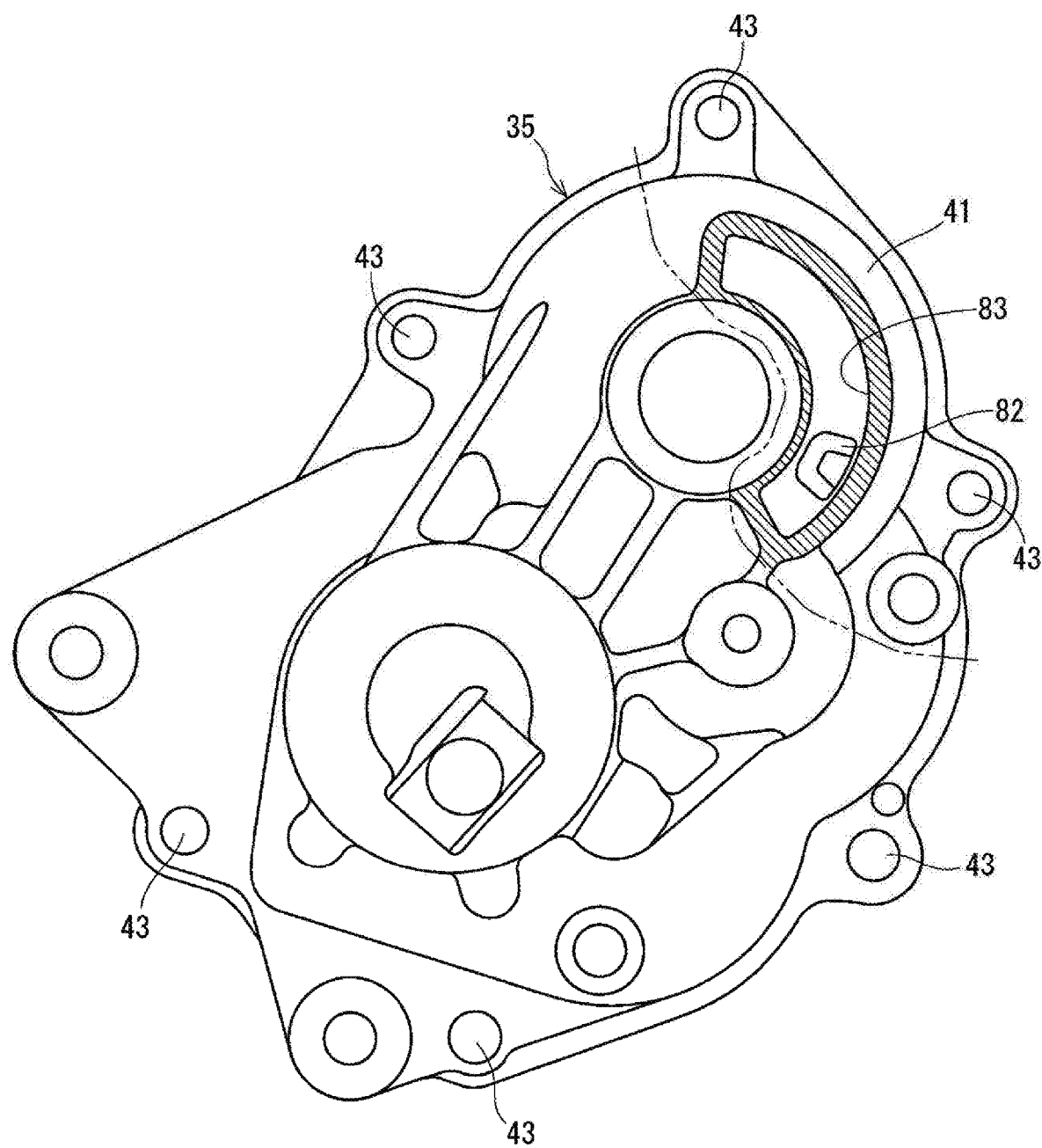
FIG. 16 is a partially fragmented cross-sectional view of a first housing segment of a housing.
Figure 17:
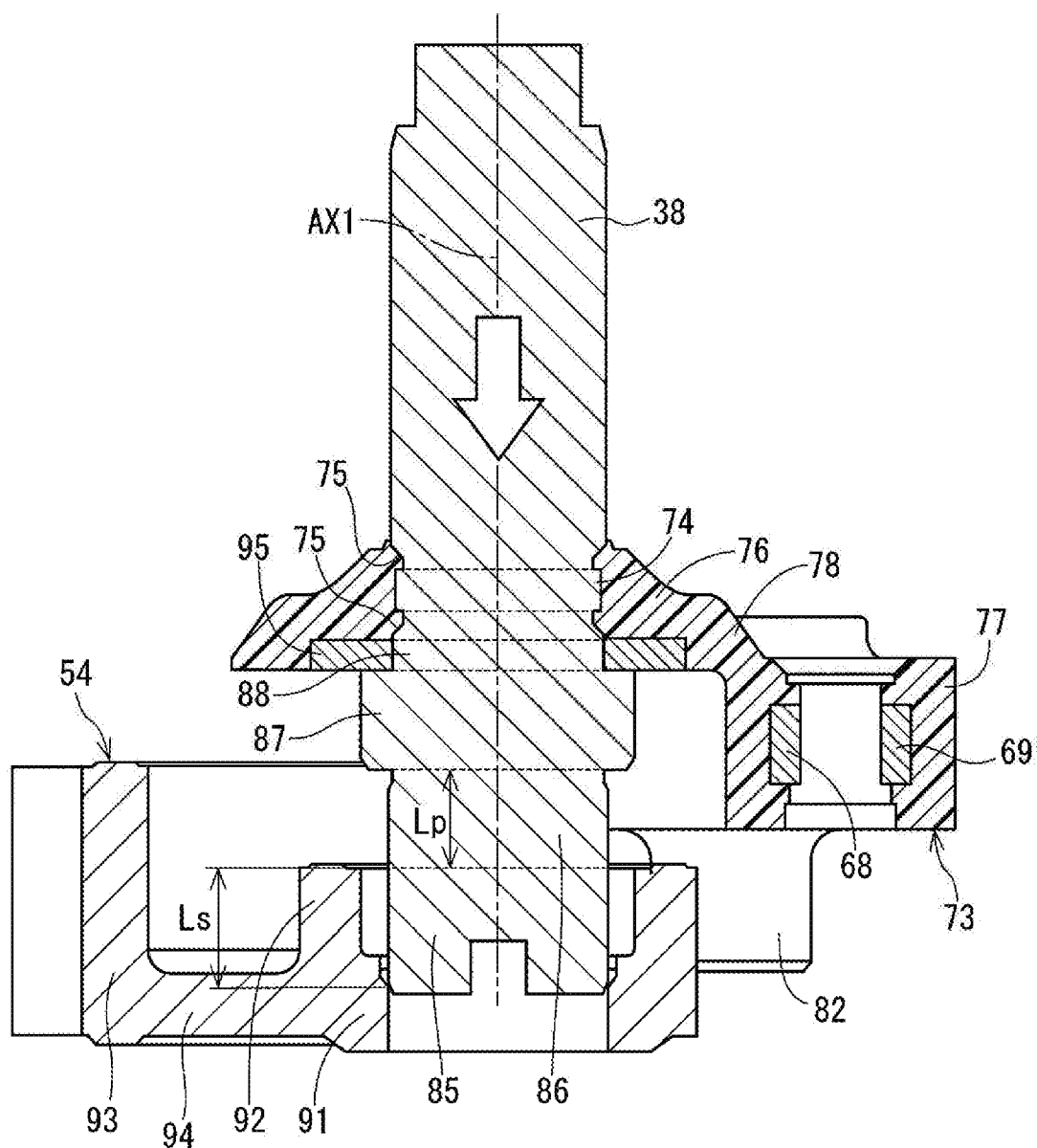
FIG. 17 is a cross-sectional view showing a state at the time of starting assembling of the final gear to the output shaft.

As shown in FIGS. 11, 13 and 16, the holding portion 77 includes a stopper 82 that is configured to abut against the first housing segment (serving as a stationary member) 41 to limit rotation of the output shaft 38. The first housing segment 41 includes a groove 83, which extends in the circumferential direction in the axial view. The stopper 82 projects into the groove 83. When the stopper 82 abuts against one circumferential end of the groove 83, the rotation of the output shaft 38 toward the one circumferential side is limited. Furthermore, when the stopper 82 abuts against the other circumferential end of the groove 83, which is opposite to the one circumferential end, the rotation of the output shaft 38 toward the other circumferential side is limited. In FIG. 16, in order to ease understanding of the structure, illustration of visible members, which are other than the stopper 82 and are normally visible through the groove 83, is omitted.

Figure 9:
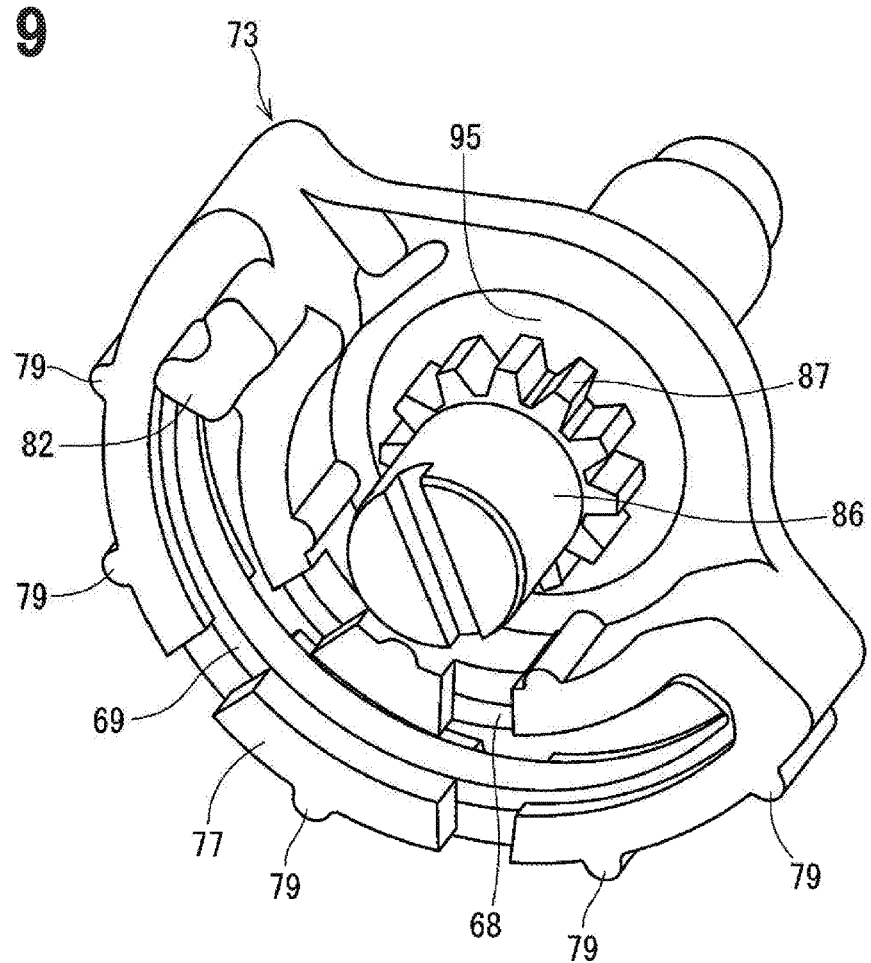
FIG. 9 is a perspective view of the output shaft, to which the magnetic circuit holder member is fixed.

As shown in FIGS. 9 and 11, the output shaft 38 has a guide shaft portion 85, a circular shaft portion 86, a non-circular shaft portion 87, a plate fitting portion 88 and the knurled portion 74, which are axially arranged in this order from one axial side. The guide shaft portion 85, the circular shaft portion 86, the non-circular shaft portion 87, the plate fitting portion 88 and the knurled portion 74 are coaxial to each other. The outer diameter increases in the order of the guide shaft portion 85, the circular shaft portion 86 and the non-circular shaft portion 87. Furthermore, the outer diameter decreases in the order of the non-circular shaft portion 87, the plate fitting portion 88 and the knurled portion 74. The bearing 48 is fitted to the guide shaft portion 85.

Figure 10:
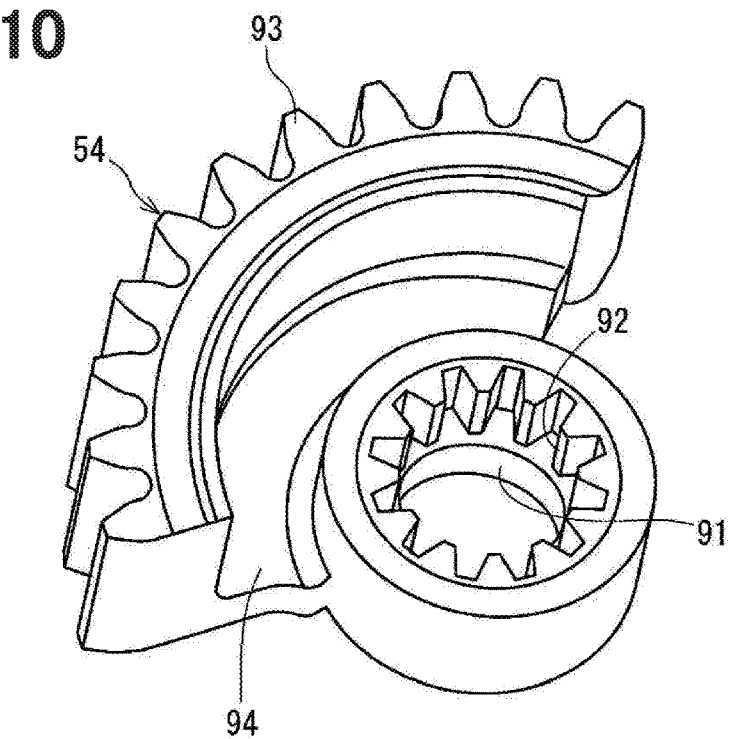
FIG. 10 is a perspective view of the final gear.

As shown in FIGS. 10 and 11, the final gear 54 has: a circular hole portion 91, into which the circular shaft portion 86 is press fitted; a non-circular hole portion 92, into which the non-circular shaft portion 87 is fitted; an external-toothed portion 93, which has a plurality of external teeth and is meshed with the second small diameter external gear 63 of the second intermediate gear 53; and a connecting portion 94, which extends straight from the circular hole portion 91 toward the radially outer side in a radial direction and is joined to the external-toothed portion 93. The external-toothed portion 93 is joined to the circular hole portion 91 through the connecting portion 94 such that a connection length between the external-toothed portion 93 and the circular hole portion 91 is minimized. In the present embodiment, the non-circular shaft portion 87 is a spline shaft, and the non-circular hole portion 92 is a spline hole.

A ring plate 95 is installed between the non-circular shaft portion 87 (i.e., a portion of the output shaft 38, which is fitted to the final gear 54) and the magnetic circuit holder member 73. The ring plate 95 is fitted to the plate fitting portion 88. An outer diameter of the plate fitting portion 88 is smaller than a spline minor diameter (a diameter of the innermost surface of the spline) of the non-circular shaft portion 87. A fitting gap between the ring plate 95 and the plate fitting portion 88 is set to a size that limits a flow of molten resin from the knurled portion 74 to the non-circular shaft portion 87 at the time of molding the magnetic circuit holder member 73.

Figure 18:
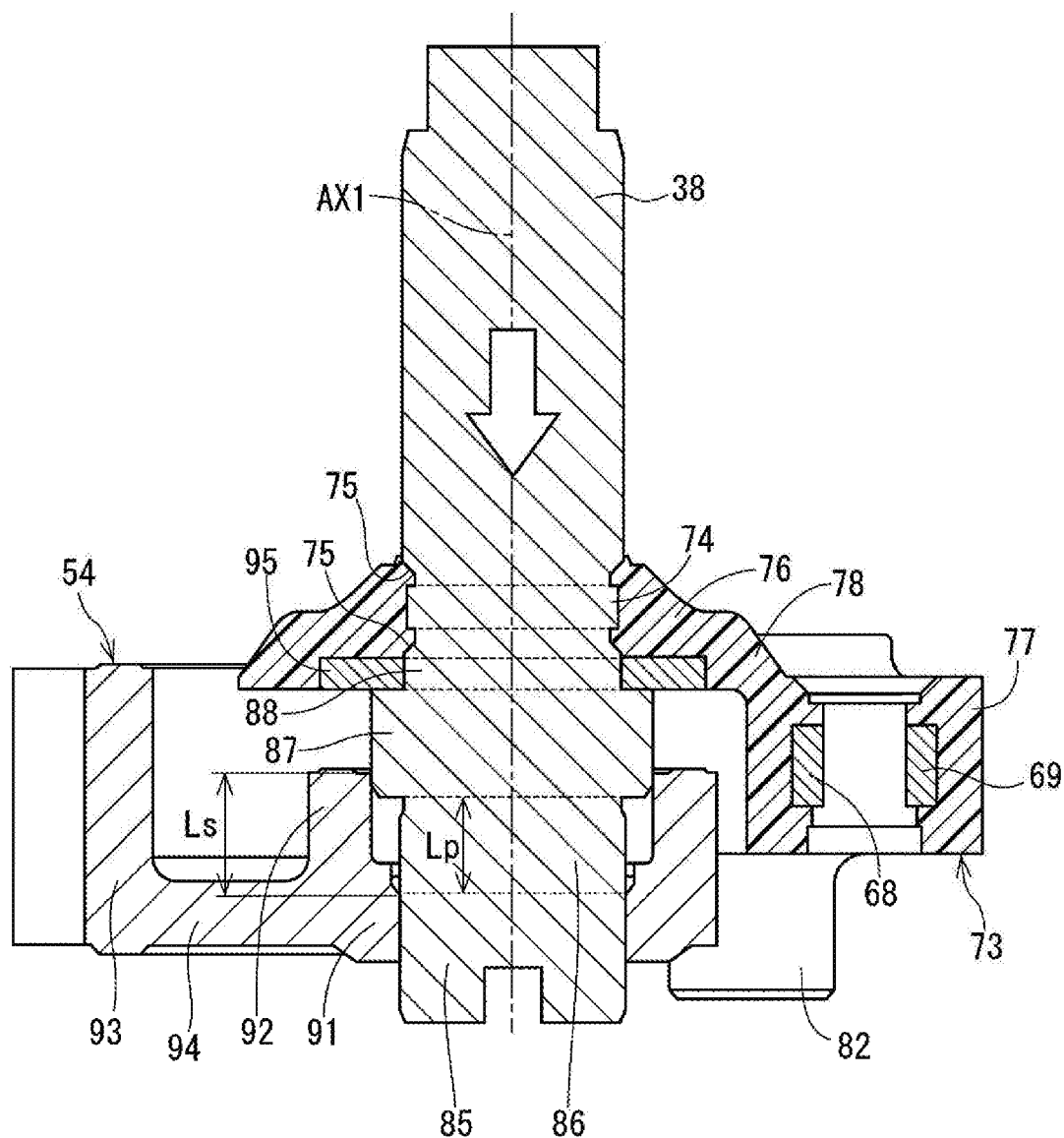
FIG. 18 is a cross-sectional view showing a state at the middle of the assembling of the final gear to the output shaft.
Figure 19:
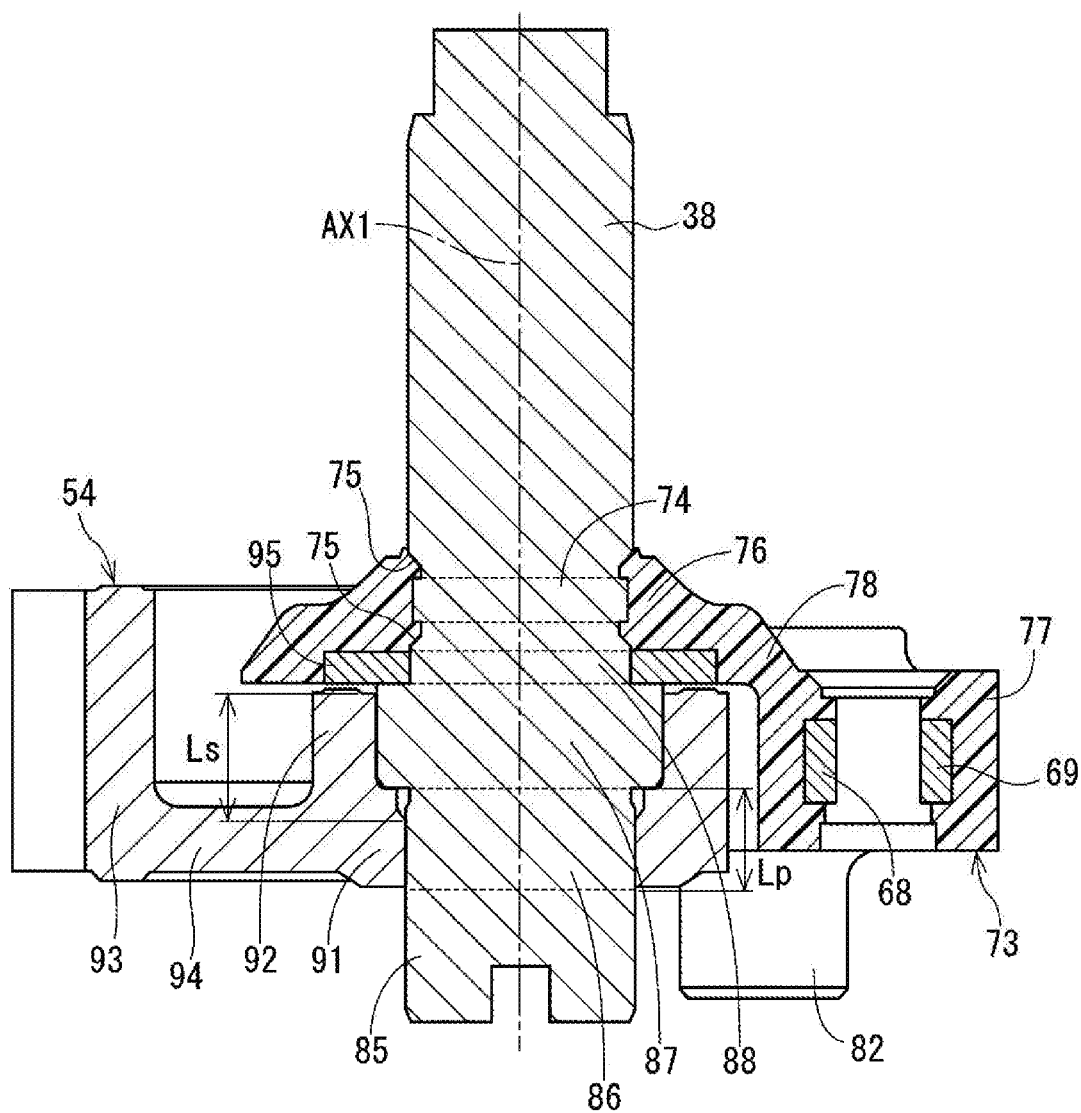
FIG. 19 is a cross-sectional view showing a state at an end of the assembling of the final gear to the output shaft.

As shown in FIG. 11, an axial length, which is measured from an end of the circular shaft portion 86 located on one axial side to an end of the non-circular shaft portion 87 located on the one axial side, is denoted by Lp. Furthermore, an axial length, which is measure from an end of the circular hole portion 91 located on the other axial side to an end of the non-circular hole portion 92 located on the other axial side, is denoted by Ls. A relationship between the axial length Lp and the axial length Ls satisfies the following equation (1). By satisfying the relationship of the equation (1), at the time of assembling the final gear 54 to the output shaft 38 in a sequence of FIG. 17, FIG. 18 and FIG. 19, the non-circular hole portion 92 is spline-fitted to the non-circular shaft portion 87 as shown in FIG. 18 before the time of press-fitting the circular hole portion 91 into the circular shaft portion 86.

$$Ls > Lp \quad \text{Equation (1)}$$

Figure 12:
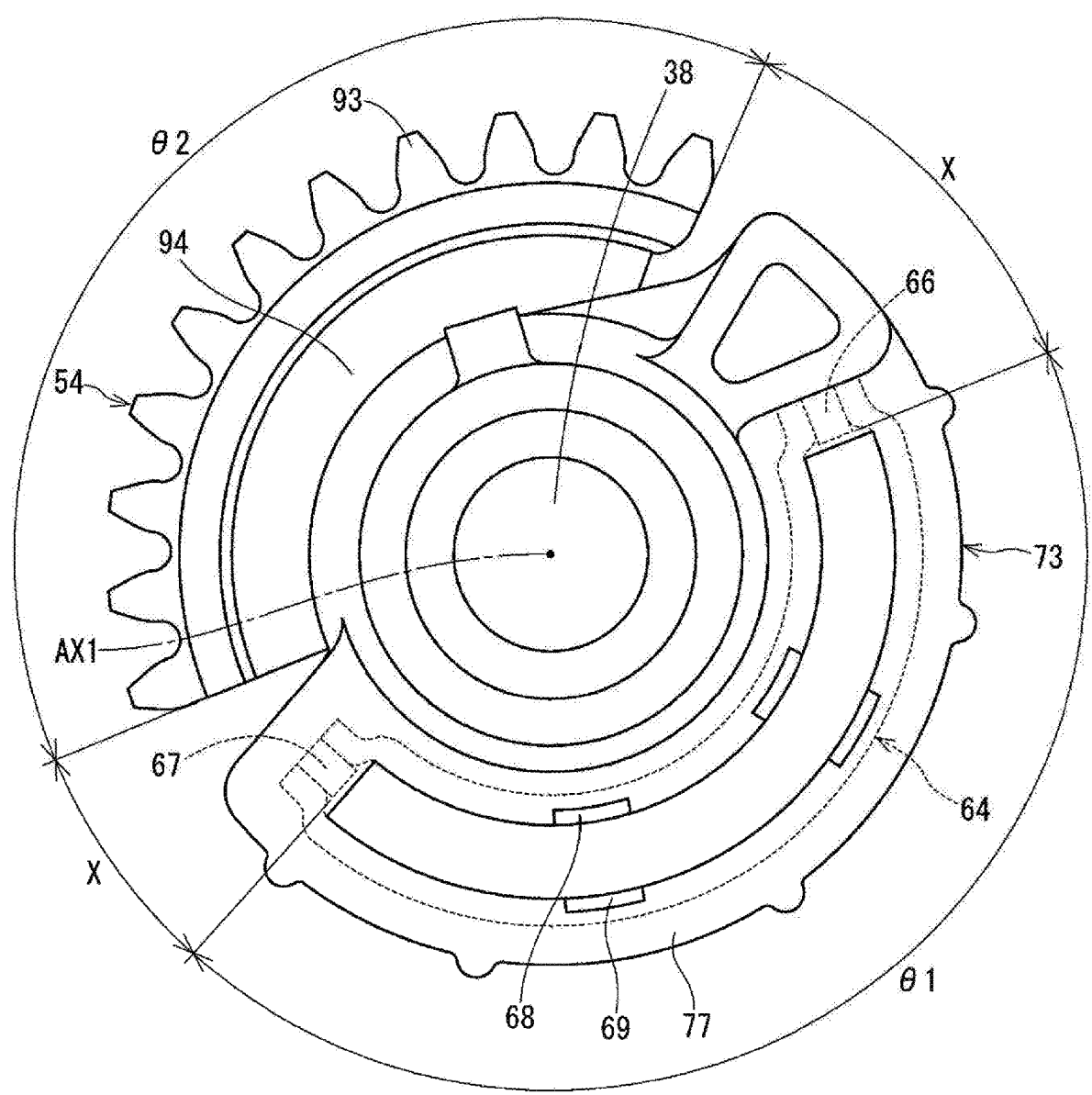
FIG. 12 is a view of the output shaft and the other components of FIG. 11 taken in a direction of an arrow XII in FIG. 11.

As shown in FIG. 12, in the axial view, the holding portion 77 is placed on an opposite side of the axis AX1, which is radially opposite to the external-toothed portion 93. A sensing range θ1 of the rotational angle sensor 39 and a gear range θ2 of the final gear 54 are separated from each other. The sensing range θ1 and the gear range 82 are provided in different ranges, respectively. Specifically, the sensing range θ1 is spaced from the gear range θ2 in the circumferential direction. Gaps X are present between the final gear 54 and the magnetic circuit device 64. A relative phase between the non-circular shaft portion 87 and the external-toothed portion 93 is set to enable positioning of the final gear 54 and the magnetic circuit holder member 73 without causing interference between the final gear 54 and the magnetic circuit holder member 73. Furthermore, the sensing range θ1 is larger than the gear range θ2. The sensing range θ1 is an angular range, in which movement of the sensing device 65 relative to the magnetic circuit device 64 is enabled. The gear range θ2 is an angular range that is from one circumferential end to the other circumferential end of the external-toothed portion 93.

As shown in FIG. 11, the fixing portion 76 of the magnetic circuit holder member 73 is located on the other axial side of the non-circular hole portion 92 of of the final gear 54. The holding portion 77 of the magnetic circuit holder member 73 is located on the radially outer side of the non-circular hole portion 92 of the final gear 54. The connecting portion 78 connects between the fixing portion 76 and the holding portion 77 while the axial position of the fixing portion 76 and the axial position of the holding portion 77 are different from each other. In the above described manner, the holding portion 77 (i.e., the portion of the magnetic circuit holder member 73, which holds the magnetic circuit device 64), is located within the axial range of the final gear 54. An axial width L1 of the holding portion 77 is set to be smaller than an axial width L2 of the external-toothed portion 93.

(Advantages)

As described above, the actuator 10 includes the electric motor 36, the output shaft 38, the speed reducer 37, the rotational angle sensor 39 and the magnetic circuit holder member 73. The speed reducer 37 includes the final gear 54, which is made of the metal and is fixed to the output shaft 38, and the speed reducer 37 reduces the speed of the rotation outputted from the electric motor 36 and transmits the rotation of the reduced speed to the output shaft 38. The rotational angle sensor 39 includes the magnetic circuit device 64 and the sensing device 65 and senses the rotational angle of the output shaft 38. The magnetic circuit holder member 73 is the non-magnetic member that is fixed to the output shaft 38, and the magnetic circuit holder member 73 is a separate member that is formed separately from the final gear 54. The magnetic circuit holder member 73 holds the magnetic circuit device 64.

Since the final gear 54 and the magnetic circuit holder member 73 are the separate members, which are formed separately, it is possible to select an optimal material for each of the final gear 54 and the magnetic circuit holder member 73. By forming the final gear 54 from the metal, it is possible to ensure the required strength against a relatively large load generated by the exhaust gas pulsation. In this way, damage to the final gear 54 is limited. Furthermore, since the magnetic circuit holder member 73 is formed as the non-magnetic member, the magnetic circuit device can be fixed to the output shaft 38 without leaking the magnetic flux and without increasing the disturbing magnetic flux. In this way, it is possible to limit the deterioration in the rotational angle sensing accuracy while implementing the structure for fixing the magnetic circuit device to the output shaft 38.

Furthermore, in the present embodiment, the sensing range θ1 of the rotational angle sensor 39 is spaced from the gear range θ2 of the final gear 54 in the circumferential direction. Also, the holding portion 77 (i.e., the portion of the magnetic circuit holder member 73, which holds the magnetic circuit device 64), is located within the axial range of the final gear 54. Therefore, the magnetic circuit device 64 is placed while using a rotational space, in which the final gear 54 is not placed, so that it is possible to avoid an increase in the size of the actuator 10. Furthermore, since the magnetic circuit device 64 is spaced from the final gear 54 made of the metal, it is possible to limit the leakage of the magnetic flux and the deterioration of the rotational angle sensing accuracy caused by the increase of the disturbing magnetic flux.

Furthermore, in the present embodiment, the sensing range θ1 is larger than the gear range θ2. Therefore, the entire operational angle of the wastegate valve 26 can be reliably sensed with the rotational angle sensor 39.

Also, in the present embodiment, the magnetic circuit holder member 73 includes the stopper 82 that is configured to abut against the first housing segment 41 to limit the rotation of the output shaft 38. Thus, by placing only the single member between the magnetic circuit device 64 and the stopper 82, the relative positional variation between the output shaft 38 and the magnetic circuit device 64 is reduced, and thereby the rotational angle sensing accuracy is improved. Furthermore, in a case where the stopper 82 is formed at the final gear 54, the configuration of the final gear 54 becomes complicated, and thereby it is difficult to form the final gear 54 by the sintering. However, in the present embodiment, there is no such a disadvantage.

Furthermore, in the present embodiment, the output shaft 38 includes the circular shaft portion 86 and the non-circular shaft portion 87. The final gear 54 includes: the circular hole portion 91, into which the circular shaft portion 86 is press fitted; and the non-circular hole portion 92, into which the non-circular shaft portion 87 is fitted. The non-circular shaft portion 87 is the spline shaft, and the non-circular hole portion 92 is the spline hole. In this way, even when the press fitting between the circular shaft portion 86 and the circular hole portion 91 is loosened, the torque can be transmitted through the fitting portion, at which the non-circular shaft portion 87 and the non-circular hole portion 92 are fitted together. Therefore, the redundancy of the torque transmitting function is improved.

Furthermore, in the present embodiment, the circular shaft portion 86 and the non-circular shaft portion 87 are axially arranged in this order from the one axial side. Also, the equation (1) described above is satisfied. In this way, at the time of assembling the final gear 54 to the output shaft 38, the non-circular shaft portion 87 is fitted into the non-circular hole portion 92 before the time of press fitting the circular shaft portion 86 into the circular hole portion 91. Therefore, the angular positioning between the output shaft 38 and the final gear 54 is eased. Furthermore, even in a case where the fitting portions of the circular shaft portion 86 and the non-circular shaft portion 87 cannot be visually recognized, the angular positioning between the output shaft 38 and the final gear 54 is possible.

Furthermore, in the present embodiment, the final gear 54 includes: the external-toothed portion 93; and the connecting portion 94, which extends straight from the circular hole portion 91 toward the radially outer side and is joined to the external-toothed portion 93. By connecting between the external-toothed portion 93 and the circular hole portion 91 by the shortest length, the stress applied to the gear can be reduced.

Furthermore, in the present embodiment, the magnetic circuit holder member 73 is made of the resin and forms the insert-molded product, in which the magnetic circuit holder member 73, the output shaft 38 and the magnetic circuit device 64 are integrated together in one piece. Therefore, in comparison to a case where the magnetic circuit holder member 73 is made of non-magnetic metal, it is possible to reduce the weight. Furthermore, since the output shaft 38 and the magnetic circuit device 64 are integrally molded, the dimensional accuracy is improved, and thereby the rotational angle sensing accuracy can be improved. Furthermore, an additional component and an additional step for fixing the magnetic circuit device 64 to the output shaft 38 is not required, so that the manufacturing costs can be reduced.

Furthermore, in the present embodiment, the ring plate 95 is installed between the non-circular shaft portion 87 and the magnetic circuit holder member 73. The ring plate 95 is fitted to the output shaft 38. In this way, at the time of molding the magnetic circuit holder member 73, the outflow of the molten resin from the knurled portion 74 toward the non-circular shaft portion 87 can be limited by the ring plate 95. Therefore, the knurled portion 74 can be placed as close as possible to the non-circular shaft portion 87 while avoiding fitting failure of the magnetic circuit holder member 73 to the non-circular shaft portion 87. Therefore, the axial size of the section of the output shaft 38, to which the final gear 54 and the magnetic circuit holder member 73 are fixed, can be reduced, and thereby the size of the actuator 10 can be reduced. Furthermore, since the overall length of the output shaft 38 is reduced, the tilting of the magnetic circuit shaft 38 is reduced. Therefore, the rotational angle sensing accuracy can be improved. Also, the ring plate 95 serves as a reinforcing material, and thereby the strength of the base portion of the magnetic circuit holder member 73, which is the resin molded product, can be improved.

Furthermore, in the present embodiment, the output shaft 38 includes: the knurled portion 74, in which the knurls are formed; and the pair of stepped portions 75 that are located on the two opposite sides of the knurled portion 74 in the axial direction and are opposed to the knurled portion 74. The magnetic circuit holder member 73 is integrally fixed to the knurled portion 74 and the stepped portions 75. In this way, the rotation of the magnetic circuit holder member 73 relative to the output shaft 38 is limited by the knurled portion 74, and the axial movement of the magnetic circuit holder member 73 can be limited by the stepped portions 75.

Furthermore, in the present embodiment, the magnetic circuit holder member 73 includes the pressing parts 79 that are respectively formed at the locations, which are outwardly spaced from the magnetic circuit device 64 in the axial view. Therefore, the magnetic circuit holder member 73 can be released from the molding die without pressing the magnetic circuit device 64 with the ejector pins 81 at the time of releasing the magnetic circuit holder member 73 from the molding die. In this way, it is possible to limit the deformation of the adjacent part of the holding portion 77, which is adjacent to the magnetic circuit device 64, and thereby it is possible to improve the rotational angle sensing accuracy.

Furthermore, in the present embodiment, the first intermediate gear 52, the second intermediate gear 53 and the final gear 54 of the speed reducer 37 are made of the iron-based sintered metal. By forming each gear from the iron-based sintered metal, heat treatment of the gear is possible. Therefore, the wear resistance of each gear can be improved by improving the gear bending strength through an improvement in the fatigue strength of the gear and improving the tooth surface strength through an improvement in the hardness of the gear.

(Other Embodiments)

In another embodiment, the material of the gears of the speed reducer is not necessarily limited to the iron-based sintered metal and may be other metal, which is other than the iron-based sintered metal. The holding portion of the magnetic circuit holder member may be formed such that the axial range of the holding portion of the magnetic circuit holder member overlaps with the axial range of the final gear, or the axial range of the holding portion of the magnetic circuit holder member is placed at the outside of the axial range of the final gear. Furthermore, the stopper, which limits the rotation of the output shaft, may be formed at any one of the other members, which are other than the magnetic circuit holder member.

Furthermore, the non-circular shaft portion of the output shaft is not necessarily the spline shaft and may be in another form, such as a shaft portion that has a cross section in a polygonal shape. In short, the non-circular shaft portion of the output shaft may have any shape, which can engage the non-circular hole portion of the final gear in the circumferential direction. Furthermore, the type of knurls of the knurled portion of the output shaft is not necessarily the linear knurl and may be any other knurl type. In short, the type of knurls of the knurled portion of the output shaft may be any other type as long as the knurls can engage the magnetic circuit holder member in the circumferential direction.

The present disclosure has been described based on the embodiment. However, the present disclosure should not be limited to the above embodiment and the structure described therein. The present disclosure encompasses various modifications and equivalents. Also, various combinations and forms, as well as other combinations and forms including only one element, more or less, are within the scope and spirit of the present disclosure.

What is claimed is:

1. An actuator configured to drive a boost pressure control valve of a supercharger, the actuator comprising:
    an electric motor;
    an output shaft;
    a speed reducer that includes a final gear, wherein the final gear is made of metal and is fixed to the output shaft, and the speed reducer is configured to reduce a speed of rotation outputted from the electric motor and transmit the rotation of the reduced speed to the output shaft;
    a rotational angle sensor that includes a magnetic circuit device and a sensing device and is configured to sense a rotational angle of the output shaft; and
    a magnetic circuit holder member that is a non-magnetic member fixed to the output shaft, wherein the magnetic circuit holder member is formed separately from the final gear and holds the magnetic circuit device.

2. The actuator according to claim 1, wherein:
    a sensing range of the rotational angle sensor is spaced from a gear range of the final gear in a circumferential direction and is larger than the gear range of the final gear;
    an axial direction of an axis of the output shaft is defined as an axial direction; and
    a portion of the magnetic circuit holder member, which holds the magnetic circuit device, is located within an axial range of the final gear in the axial direction.

3. The actuator according to claim 1, wherein the magnetic circuit holder member includes a stopper that limits rotation of the output shaft when the stopper abuts against a stationary member.

4. The actuator according to claim 1, wherein:
    the output shaft includes a circular shaft portion and a non-circular shaft portion; and
    the final gear includes:
        a circular hole portion, into which the circular shaft portion is press fitted; and
        a non-circular hole portion, into which the non-circular shaft portion is fitted.

5. The actuator according to claim 4, wherein:
    the non-circular shaft portion is a spline shaft; and
    the non-circular hole portion is a spline hole.

6. The actuator according to claim 4, wherein:
    the circular shaft portion and the non-circular shaft portion are axially arranged in this order from one one axial side;
    an axial length, which is measure from an end of the circular shaft portion located on the one axial side to an end of the non-circular shaft portion located on the one axial side, is denoted by Lp;
    an axial length, which is measure from an end of the circular hole portion located on another axial side to an end of the non-circular hole portion located on the another axial side, is denoted by Ls; and
    there is satisfied a relationship of Ls>Lp.

7. The actuator according to claim 6, wherein a guide shaft portion, which is coaxial with the circular shaft portion and has a diameter smaller than a diameter of the circular shaft portion, is formed on the one axial side of the circular shaft portion.

8. The actuator according to claim 4, wherein the final gear includes:
    an external-toothed portion; and
    a connecting portion, which extends straight from the circular hole portion toward a radially outer side in a radial direction and is joined to the external-toothed portion.

9. The actuator according to claim 1, wherein the magnetic circuit holder member is made of resin and forms an insert-molded product, in which the magnetic circuit holder member, the output shaft and the magnetic circuit device are integrated together in one piece.

10. The actuator according to claim 9, comprising a ring plate that is installed between a portion of the output shaft, which is fitted to the final gear, and the magnetic circuit holder member, wherein the ring plate is fitted to the output shaft.

11. The actuator according to claim 9, wherein:
    the output shaft includes:
        a knurled portion, in which knurls are formed; and
        a pair of stepped portions that are located on two opposite sides of the knurled portion in the axial direction and are opposed to the knurled portion; and
    the magnetic circuit holder member is integrally fixed to the knurled portion and the pair of stepped portions.

12. The actuator according to claim 9, wherein the magnetic circuit holder member includes a pressing part that is formed at a location, which is outwardly spaced from the magnetic circuit device in an axial view.

13. The actuator according to claim 1, wherein:
    the speed reducer includes a first intermediate gear and a second intermediate gear, which are located between the electric motor and the final gear; and
    the first intermediate gear, the second intermediate gear and the final gear are made of iron-based sintered metal.

* * * * *